3,553,073
PACKAGING MATERIAL INCLUDING AT LEAST
THREE LAMINATION LAYERS OF MATERIALS
HAVING DIFFERENT VISCOSITIES, AND A
PACKAGE PRODUCED THEREFROM
Hans Anders Rausing and Thorsten Lennartsson Lindh,
Lund, Sweden, assignors to AB Tetra Pak, Lund,
Sweden, a Swedish company
Filed Feb. 10, 1966, Ser. No. 526,471
Claims priority, application Switzerland, Feb. 23, 1965,
2,436/65
Int. Cl. B32b 7/02, 27/08, 27/10
U.S. Cl. 161—166         3 Claims

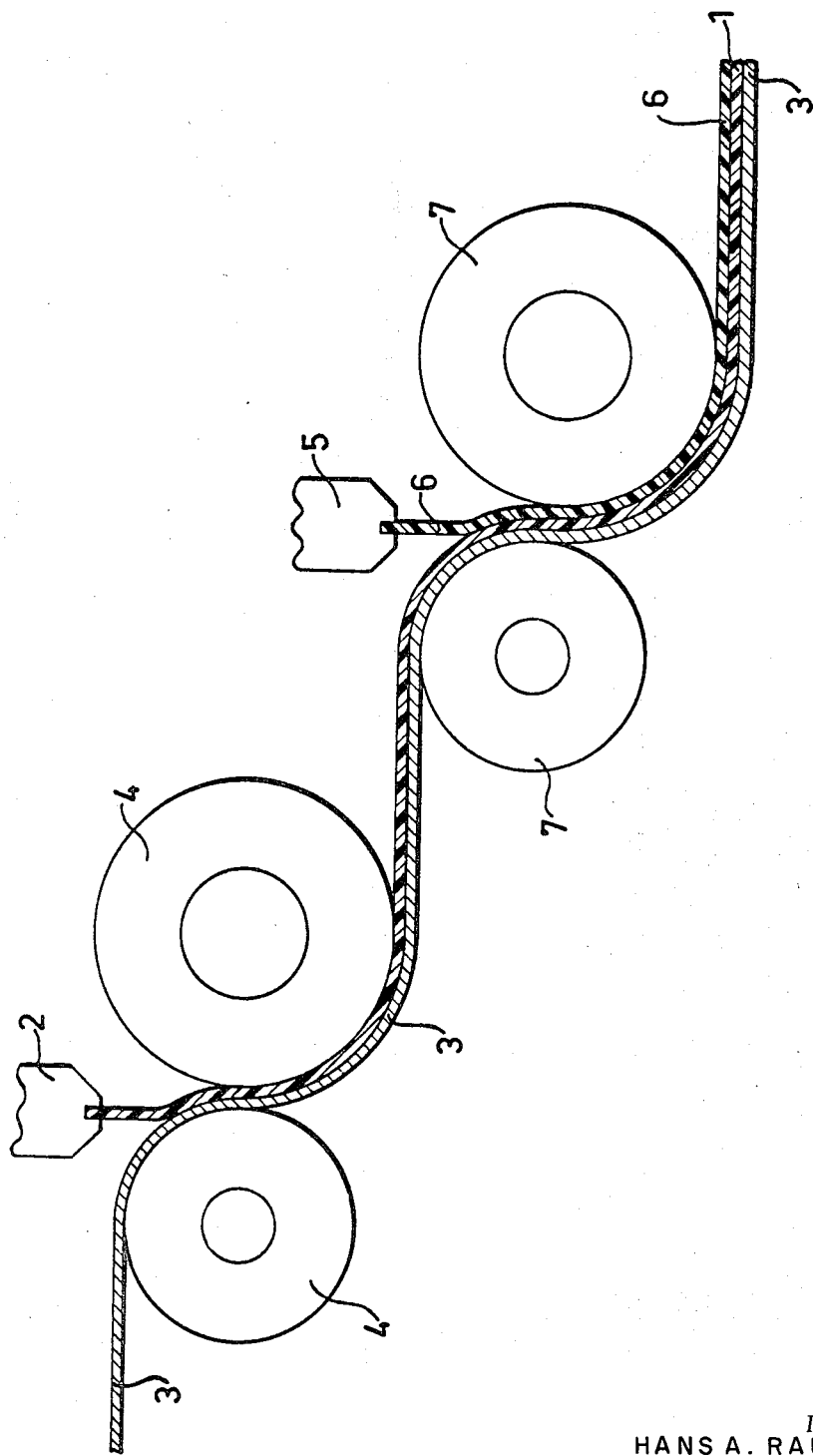

ABSTRACT OF THE DISCLOSURE

A laminated packaging material is disclosed comprising an outer layer of paper, an inner heat sealable layer of polyethylene, and an intermediate layer of polypropylene.

---

The present invention refers to a packaging material, including at least three lamination layers, namely an outer base material layer, for example of paper, an inner layer intended for heat sealing and an intermediate layer arranged between these layers, the two last-mentioned layers consisting of thermoplastic material.

The designations inner and outer have been used in accordance with the position occupied by the respective layer, when the packaging material is used in a finished package. The term outer, however, does not imply that the layer is located outermost, since the outer layer may also be provided with one or more further lamination layers on its outside.

The principal characteristic of the invention is that the materials in the various layers have temperature-viscosity curves such that the viscosity in the case of heat supply through the outer layer despite the inwardly decreasing temperature, becomes lower for an inside layer than for the layer lying outside the former, whereby it is substantially prevented that material from one layer is pressed into the layer lying outside the former at the heat sealing, which may then take place by melting the inner layer only.

It is principally intended to use polyolefines, e.g. polyethylene or polypropylene, as material for the intermediate and inner layers, but also other materials suitable for heat sealing may be used, e.g. polyvinyl chloride, polyvinylidene chloride or copolymers in which these and/or the abovementioned plastic materials are included.

Preferably, paper is used for the base material layer, polypropylene for the intermediate layer, and polyethylene for the inner layer. Alternatively, for the two last-mentioned layers for example polyethylene or polypropylene of different qualities may be used alone. This is because in respect of both polyethylene and polypropylene the viscosity and the temperature limits of melting region vary highly for example with the molecular weight.

In the first place, the packaging material produced by the invention is intended to be used for manufacturing packages by forming a web thereof into tube form, the free longitudinal edges being joined together into a longitudinal joint, whereupon the individual packages, which may be for example cushion-shaped, tetrahedron-shaped or parallelepipedic, are produced by flat-pressing and heat sealing in sealing zones transverse in relation to the tube axis and are separated by cuts in these zones. The filling material is then supplied between the sealing of two consecutive zones.

At this sealing the heat is normally supplied by means of heating strips on one or more pairs of jaws effecting the flat-pressing, the supplied amount of heat having to be so great that the inner surface of the innermost layer melts. Normally, for this purpose a material is used which consists of a base material layer which on the sealing side, i.e. the inner side, is coated only with a layer of plastic material. To obtain a satisfactory transverse sealing in this case a thicker plastic layer will be required than would otherwise be necessary for the rest of the package from a point of view of strength and tightness. If too thin a layer is used, it has in fact been found that there is a risk that the layer as a whole will be pressed into the base material layer, whereby the seal may fail to be tight.

When using the new packaging material according to the present invention an intermediate layer will always remain nonmelted, so that this risk is eliminated. It has been found that with the new material one may have an overall thickness of the two plastic layers which is substantially below the thickness of the single plastic layer earlier used.

By the present invention it becomes furthermore possible to choose the material for the intermediate layer substantially independently of the final heat sealing, i.e. apart from the requirement that this material shall be more highly melting than the sealing layer, one may use the most suitable material possible in relation to the base material layer. Furthermore, the material of the intermediate layer may be applied at the most suitable temperature.

Further, owing to the present invention, it becomes possible to choose the material for the inner layer in a way most suitable from a point of view of sealing, i.e. it is generally not necessary to take into consideration the behaviour of this material in relation to the material of the base material layer.

The adhesion between the two innermost layers, i.e. the sealing layer and the intermediate layer, causes no problems, if as materials for these two layers closely related thermoplastics which are easily united are chosen.

The characteristics of a plastic layer produced by extrusion may be varied, in the case of a certain starting material, by using different temperatures of application, varying layer thicknesses, differing cooling rates or by the choice of processing atmosphere, respectively. All these factors influence, inter alia, the degree of oxidation which in turn directly influences the viscosity. Thereby it becomes possible in the manufacture of the packaging material according to the invention to use the same starting material and nevertheless produce layers having the desired different characteristics. For example, the ozone content of the processing atmosphere influences the degree of oxidation.

If it is desired to produce a material which is suitable for closure under a liquid surface, one may, for the intermediate layer choose a material having good adhesion both to the base material layer and to the inner layer, and for the inner layer choose a nonoxidized and nonpolarized plastic material which forms a surface from which liquid molecules can be more easily deplaced at the sealing.

In the accompanying drawing is illustrated, diagrammatically and by way of example, how the packaging material according to the invention can be manufactured by extruding a plastic film 1 serving as said intermediate layer from an extrusion nozzle 2 on to a web of paper 3 serving as said base material layer and calendering the laminate obtained between a first pair of rolls 4, 4. From a second extrusion nozzle 5 a further plastic film is then extruded, which has been designated by 6 and which thus forms the abovementioned inner layer, i.e. the sealing layer proper. The three layer laminate obtained is finally calendered between a second pair of rolls 7, 7. The various pairs of rolls 4, 4 and 7, 7 may be kept at different temperatures which have been adjusted to what is desirable to get the best possible adhesion between the base material layer 3 and the intermediate layer 1 and to get the desired characteristics of the inner or sealing layer 6, respectively.

However, the invention is obviously not limited to the above-described example only, but may be varied within the scope of the following claims. For example, previously known laminating machines other than that shown may be used for producing the packaging material according to the invention. Further, the base material layer 3 may be of course be laminated, on the side forming the outer side of the finished package, with materials for influencing the appearance and/or function of the package.

That which is claimed is:

1. A laminated packaging material comprising: an outer layer of paper material, an inner layer of thermoplastic material, and an intermediate layer of thermoplastic material, said layers of material having temperature viscosity curves such that the viscosity of said layers is progressively lower from the outer layer through the inner layer whereby said layers will not stick together when said material is formed into a container and heat sealed.

2. The structure of claim 1 wherein said inner and intermediate layers consist of polyolefine material.

3. The structure of claim 2 wherein said intermediate layer is polypropylene and said inner layer is polyethylene.

References Cited

UNITED STATES PATENTS

| | | | |
|---|---|---|---|
| 2,932,323 | 4/1960 | Aries | 117—161UHH |
| 2,956,723 | 10/1960 | Tritsch | 161—252 |
| 3,348,995 | 10/1967 | Baker et al. | 117—161UHH |

FOREIGN PATENTS

| | | | |
|---|---|---|---|
| 641,568 | 8/1950 | Great Britain | 156—244 |

ROBERT F. BURNETT, Primary Examiner

R. O. LINKER, JR., Assistant Examiner

U.S. Cl. X.R.

117—76, 161; 156—244; 161—250, 252